April 18, 1933.        O. A. KNOPP        1,904,029
METHOD AND APPARATUS FOR RECORDING ELECTRICAL QUANTITIES Filed Sept. 16, 1927

INVENTOR
Otto A. Knopp
BY
John Flano
HIS ATTORNEY

Patented Apr. 18, 1933

1,904,029

UNITED STATES PATENT OFFICE

OTTO A. KNOPP, OF OAKLAND, CALIFORNIA

METHOD AND APPARATUS FOR RECORDING ELECTRICAL QUANTITIES

Application filed September 16, 1927. Serial No. 220,052.

This invention relates to the measurement and recording of electrical quantities, especially for polyphase circuits.

It is now quite common to provide an instrument that is arranged to trace a graph on a graduated sheet moved at a uniform rate as by clockwork, and exhibiting the kilowatt consumption in a three-phase circuit or network. This is accomplished by two wattmeters arranged to influence a common pointer or pen. The current elements of these meters are arranged respectively in two of the three lines feeding the network under measurement; and the potential elements are respectively connected between these two lines and the third line. It can be readily shown, that when these elements are in proper polarity relations, the combined torques of the two meters constitute a measure of the total power consumption.

It is one of the objects of my invention to make it possible to utilize the very same instrument for providing an indication of the current that is consumed by the circuit.

The kilowatt consumption as is well-known, is a function of the current flowing in any one of the lines, of the potential difference between the lines, and also of the power factor. If the power factor were always constant, it would be possible to compute the current consumption at any time from the wattmeter record; but in alternating current networks, where a large variety of loads is used, the power factor varies with the total load consumption. It is another object of my invention to make it possible for such a recording wattmeter to produce such a graph that will not only exhibit the consumption, but by proper interpretation, will also provide an indication of the current consumed. This is possible because the electromotive force is usually constant within close limits.

It is still another object of my invention to make it possible to obtain this result by the mere addition of only a few simple and inexpensive parts to the usual form of recording wattmeter.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing.

Figure 1:
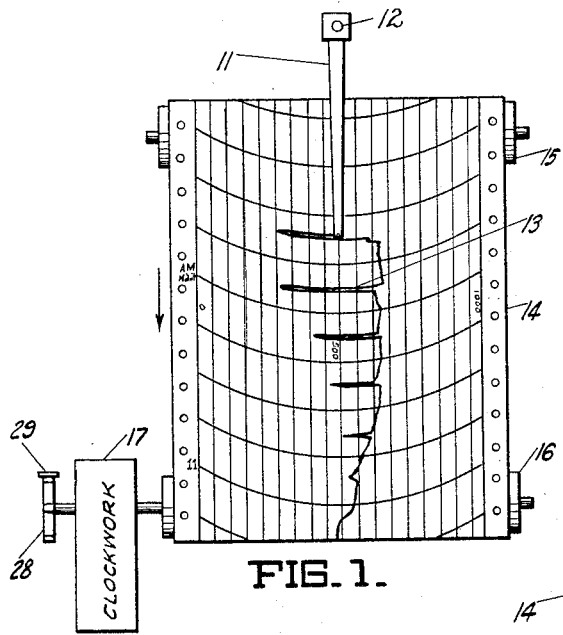
Figure 1 is a diagrammatic view exhibiting the manner in which a wattmeter incorporating my invention operates.

In Fig. 1, I show a stylus 11 that is pivoted at 12 and that is caused to trace a record 13 on a chart 14. This chart is shown as moved from a roll 15 onto a roll 16, as by the aid of a constant speed mechanism such as clockwork 17, mechanically connected with roll 16. In the usual form of recording instrument, the stylus 11 is influenced at all times by two wattmeters, as explained hereinbefore to record the total power consumption in a three-phase network. Since chart 14 is marked in time and in power units as shown, it would be possible to read off the chart the power consumption at any particular time.

Figure 2:
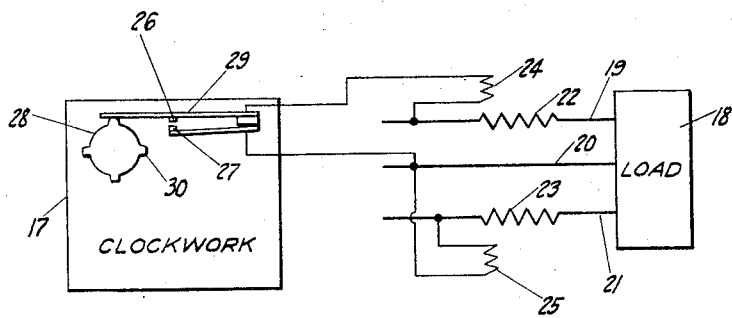
Fig. 2 is a schematic wiring of the same.

Referring now to Fig. 2, the three-phase load 18 is shown as supplied by the three lines 19, 20, and 21. In two of the lines such as 19 and 21, are shown the current elements 22 and 23 respectively. The potential elements 24 and 25 are also indicated; these are to be connected between lines 19 and 20, and between lines 21 and 20 in order that both meters may influence the stylus 11, as is well understood. Element 25 is shown as being permanently connected in this manner.

Now it is also understood that the ratio of the two wattmeter torques is a function of the power factor of the load. Thus for example, if both instruments have an equal value of torque, both torques being additive to influence stylus 11, the power factor is unity; as the power factor decreases to a value of .5, the ratio of the torques also decreases from unity to zero, the zero ratio corresponding to the .5 power factor. Of course, the determination of which torque to use as the numerator of this ratio depends only upon the phase rotation, and on any given installation this can easily be determined by trial. As the power factor decreases from .5 to zero, the ratio becomes negative; that is, one wattmeter will buck the other, and these negative values will range from zero to unity, the unity value corresponding to zero power factor.

By the aid of my invention, a record can be made of the relative values of the wattmeter torques at frequent intervals and by proper calculation, the power factor can readily be obtained, and from the power factor, power consumption and voltage, the current value can be derived. In order to accomplish these results, I arrange for periodically rendering one of the wattmeters inactive for a short interval, whereby during that interval, only the indication of one wattmeter is recorded. Then by comparing this indication with the total indication immediately preceeding or following the point where the inaction of one meter occurs, the ratio of the two wattmeter readings can be secured.

For this purpose, I show one of the potential elements, such as 24, as controlled by contacts 26 and 27 which are normally in engagement, but which are periodically urged apart as by a wheel 28 rotated by clockwork 17; this wheel acting on spring arm 29 that carries one of the contacts. Thus there can be projections 30 on this wheel spaced evenly apart so as to lift the arm 29 once every fifteen minutes, or at any other desired interval.

Figure 3:
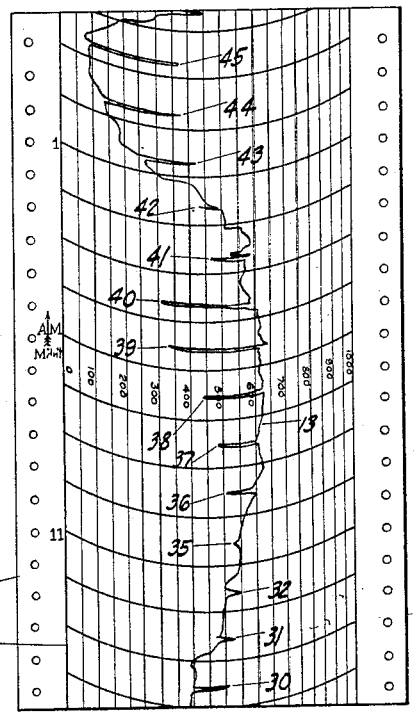
Fig. 3 is a graph such as is produced by the aid of my invention.

The graph 13 (Fig. 3) represents the character of the record made with my device. When the circuit of potential element 24 is opened at contacts 26 and 27, the meter 24—22 is of course incapable of exerting any torque, and only the indication of meter 23—25 is recorded. At the lower end of the graph, the notches 30, 31 and 32 being toward the right, indicate that the meter 23—25 records more than the combined registration of both meters; and this means that the inactive meter had been registering negatively. Therefore the ratio of the meter indications is negative and is represented by the depth of notch 30, 31 or 32 divided by the distance between the zero reference line 33 and the peak of the notch. The depth of the notch represents the negative value of the indication of the meter 22—24; and the distance between line 33 and the peak represents of course, the indication of meter 23—25 alone. This ratio being negative, the power factor is below .5, the exact value being readily determined from the observed ratio value.

The notches 31 and 32 are not so deep as notch 30, but they still represent negative values for the indication of meter 22—24, the ratio being less and therefore showing that the power factor approached a value of .5 as time went on. The next notch 35 is almost imperceptible, and therefore the ratio is zero, corresponding to .5 power factor.

The graph shows at this point an increasing power factor, for the succeeding notches 36 to 42 extend to the left, and show that the indications of both meters are positive, and the power factor is between .5 and unity. The ratio to be considered is again the depth of the notch as numerator, and the distance between line 33 and the peak of the notch as denominator. Notch 40 shows a condition of substantially unity power factor, this ratio being substantially unity. From this point on the power factor again decreases, as evidenced by the shortening peaks 41 and 42, and in fact becomes again less than .5, since the succeeding peaks 43, 44, 45 again extend to the right.

It is evident that the character of the main graph is unaltered; its continuity is interruped only for very short periods, and the load varying only gradually, the value of the graph is not reduced.

As explained before, the power factor being thus obtained, the current flowing in the lines can readily be derived therefrom.

Figure 4:
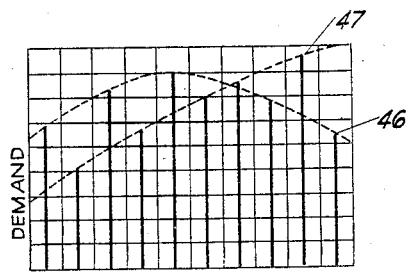
Fig. 4 is a representation of a graph that another form of recording instrument can produce, which incorporates my invention.

In some types of instruments, the demand is registered at regular intervals by the aid of watthourmeters. The amount of movement of the stylus during say each half hour shows the average power consumption in that period, and this value is used to determine the rates charged for the service. Such indications can be secured for example by a periodic unclutching of the pointer 11 from the meter shaft, giving a series of lines starting at the left of the chart. In such instruments also, I can arrange an electric disconnection of one of the meters, and timed in such a way that alternate lines represent the full registration and the registration of one meter only. Such a graph is shown in Fig. 4. In that case, it is possible to trace curves 46 and 47 as envelopes respectively of those lines corresponding to the simultaneous energization of both meters, and of those lines corresponding to the energization of but one meter. The power factor can be computed as before, by obtaining the ratio between the difference in the ordinates of curves 46 and 47, taken as the numerator, and the ordinates of curve 47, taken as the denominator. The numerator then corresponds to the registration of the meter which is periodically inactive; and the denominator corresponds to the registration to the continuously active meter.

I claim:
1. In a system for recording the power consumption of a polyphase network having a pair of meter elements, the method which comprises moving a chart at uniform speed, actuating a common graph drawing implement in accordance with the actuation of the meter elements, and periodically rendering one only of the elements inactive for a short period.

2. In a recording system for a polyphase network, a pair of meter elements, a common recording element driven simultaneously by both of said meter elements, and means for periodically rendering one only of said meter elements inactive.

3. In a recording system for a polyphase network, a pair of meter elements, a common graph drawing implement for both meter elements, a chart for said implement, means for moving the chart at constant speed, and means for periodically rendering one only of said meter elements inactive.

4. In a recording system for a polyphase network, a pair of meter elements, a common graph drawing implement for both meter elements, a chart for said implement, means for moving the chart at constant speed, and means operated by said constant speed means for electrically disconnecting one only of the meter elements.

5. In a recording system for a polyphase network, a pair of meter elements connected to measure the power consumption of said network, a common recorder for both meter elements, and means for obtaining a periodic record of the power factor in the system, including means whereby the ratio of the torques of the meter elements can be compared.

6. In a recording system for a polyphase network, a pair of meter elements connected to measure the power consumption of said network, a common recorder for both meter elements, and means for obtaining a periodic record of the power factor in the system, including means for periodically rendering one only of said meter elements inactive for a short period.

7. In a system for drawing a graph showing the power consumption in a polyphase network, a pair of meter elements connected to measure the total power consumption and to draw a graph thereof, and means whereby for a short interval one only of said meter elements is rendered inactive, so that a periodic record of the relative torques of the two meter elements is obtained.

In testimony whereof I have hereunto set my hand.

OTTO A. KNOPP.